March 3, 1964  M. V. STOCKING  3,123,379
ADJUSTABLE SEAT FOR CHILD'S VEHICLE
Filed Feb. 5, 1962
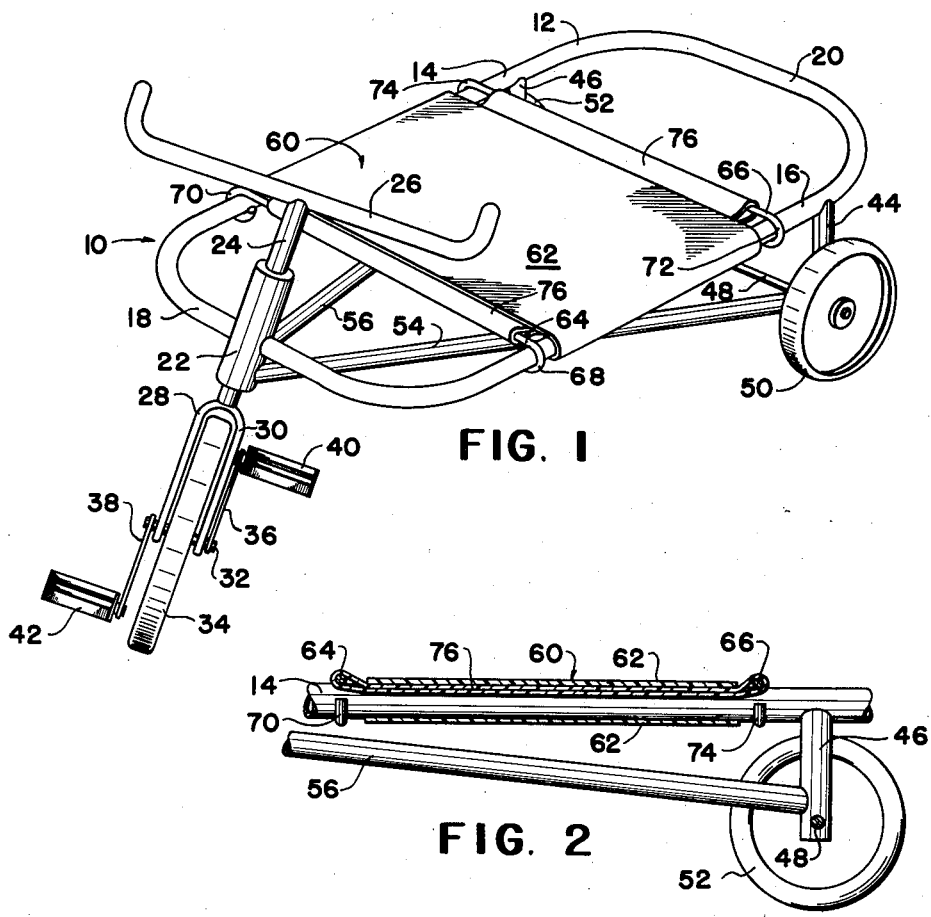
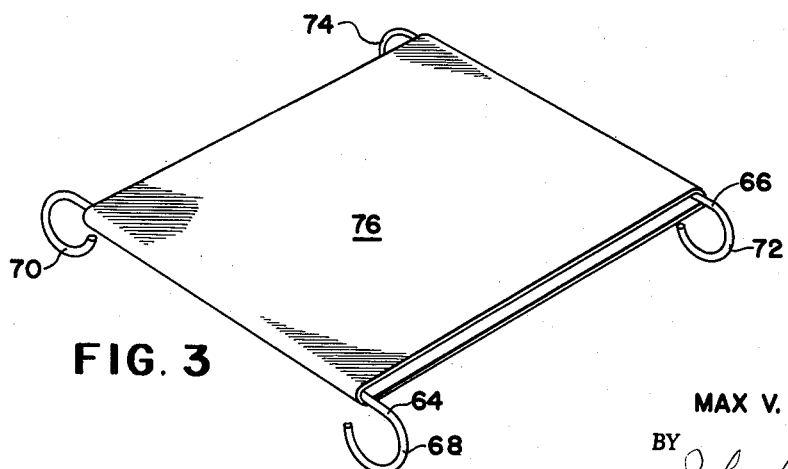
INVENTOR.
MAX V. STOCKING
BY John H. Widdowson
ATTORNEY 3,123,379
ADJUSTABLE SEAT FOR CHILD'S VEHICLE
Max V. Stocking, 1424 E. 4th, Winfield, Kans.
Filed Feb. 5, 1962, Ser. No. 171,141
4 Claims. (Cl. 280—282)

This invention relates to vehicle means. In a more specific aspect this invention relates to a child's vehicle. In a still more specific aspect, the invention relates to a scooter-like vehicle which can be ridden by the rider kneeling on the floor or seat of the vehicle with one knee and pushing on the ground or against the ground with the foot of other leg.

Various types of vehicles including vehicles particularly constructed for use by children are known to the prior art. These include common scooters, wagons, tricycles, and the like of well-known constructions. The vehicles of the prior art devices utilize stationary seats, floors or the like which are rigidly secured to the supporting means therefor thus making the vehicle usable by children of only limited size or age ranges.

In accordance with the present invention, a vehicle is provided which overcomes the deficiencies of the prior art devices. The vehicle of the invention includes open frame means having a plurality of spaced wheel means operatively connected thereto and supporting same. Means are provided with the wheel means to steer the vehicle in operation. Seat means or a kneeling floor are provided and are carried by the frame means thereacross and are positionably adjustable relative to the frame means by the user so that children of various ages and sizes can readily adjust the kneeling floor or seat means to the desired position during operation of the vehicle.

In a preferred specific embodiment of the invention, a scooter-like vehicle is provided which includes a generally rectangular tubular frame having side portions and end portions. A collar is secured to the frame and is vertically and centrally positioned relative to one of the end portions of the frame. A steering post is rotatably mounted in the collar and projects from both ends thereof. A handle bar is secured to the upper end portion of the post and the lower end portion of the post is preferably bifurcated and has an axle positioned in the bifurcated end thereof. A front wheel is rotatably mounted on the axle and crank arms are provided and secured in end portions to opposite ends of the axle. Two pedals are desirably provided and secured in the other end portions of the crank arms so that the vehicle can be propelled by the pedals, if desired. Two supports are rigidly secured in one end portion and in mirror image relation to opposite ones of the side portions of the frame near the other end portion of the frame. These supports project downwardly in spaced and generally parallel relation from the frame and have an axle extending therebetween and secured to the other end portion thereof. Two rear wheels are rotatably mounted on opposite end portions of the axle on the supports and braces are provided and secured in end portions to the collar below the tubular frame and diverge therefrom and are secured in the other end portions to the supports. A relatively wide and continuous plastic sheet transversely extends between the side portions of the frame and surrounds same and is positioned between the supports and the forward end portion of the frame. Two elongated rods are provided and each end portion of each of the rods has an integral hook formed thereon. The rods are positioned on the frame with the hooks slidably engaging the side portions of the frame on opposite sides of the sheet. Another continuous plastic sheet is preferably provided and surrounds and is positioned between the rods and passes between the layers of the first-named sheet with the last-named sheet extending longitudinally of the tubular frame. The first-named sheet and the rods can be adjusted longitudinally relatively to the frame means to position the sheets in the desired position. The sheets form an adjustable kneeling floor or seat for the vehicle. The vehicle can be propelled by a child kneeling with one knee engaging the kneeling floor or seat and with the foot of the other leg pushing against the ground to move the vehicle or the child can sit on the kneeling floor or seat and pedal with the feet.

Accordingly, it is an object of the invention to provide new vehicle means.

Another object of the invention is to provide a new scooter-like vehicle.

A further object of the invention is to provide a new scooter-like vehicle having adjustable kneeling floor or seat means therewith.

A further object of the invention is to provide a new vehicle for a child or the like having a kneeling floor or seat therewith which is constructed of layers of a fabric material extending transversely to each other and adjustably connected to and extending between open frame means.

Another object of the invention is to provide a relatively light weight and inexpensive vehicle for children and the like.

A still further object of the invention is to provide a new child's vehicle which can be operated as a scooter or by pedals.

Various other objects, advantages and features of the invention will become apparent to those skilled in the art from the following description taken in conjunction with the accompanying drawings, in which:

FIG. 1 is an isometric view of a preferred specific embodiment of the vehicle of the invention.

FIG. 2 is an elongated longitudinal partial cross section view through the vehicle of FIG. 1.

FIG. 3 is an isometric view of a portion of a preferred specific embodiment of the adjustable seat or kneeling floor for a vehicle.

The following is a discussion and description of a preferred specific embodiment of the new vehicle of the invention, such being made with reference to the drawings whereon the same reference numerals are used to indicate the same or similar parts and/or structure. It is to be understood that such discussion and description is not to unduly limit the scope of the invention.

Referring now to the drawings in detail, the preferred specific embodiment of the vehicle of the invention is shown generally at 10 and includes frame means indicated generally at 12. The frame means 12 is preferably of an open structure as illustrated and is elongated and generally rectangular in shape and includes side portions 14 and 16 and end portions 18 and 20. The frame means 12 can be made of any suitable material and is preferably made of a tubular metallic material, such as aluminum, such being desirable in reducing the overall weight of the vehicle.

A collar 22 is desirably provided and is vertically and centrally secured to the center of the end portion 18 of the frame means 12. The frame can be rigidly secured to the collar 22 by welding or other suitable means. A steering post 24 is provided and passes through and is rotatably mounted in the collar 22 and the post 24 projects from both ends of the collar 22 as shown. A handle bar 26 of common construction is secured to the upper end portion of the post 24 in any suitable manner.

The lower end portion of the post 24 is preferably bifurcated or forked and has spaced portions 28 and 30 which receive and carry in their lower end portions an axle 32. A front wheel 34 is rotatably carried by the axle 32 and is turned by movement of the steering wheel or handle bar 26 in the common manner. Two front wheels can be used if desired.

Two crank arms 36 and 38 are provided and each are secured in one end portion to the opposite ends of the axle 32 and have pedals 40 and 42 secured to the other end portions thereof in the usual manner so that the vehicle can be propelled by use of the pedals 40 and 42 in the manner of a tricycle or the like. The two crank arms 36 and 38 and the two pedals 40 and 42 can be omitted when two front wheels are provided.

Two supports 44 and 46 are each rigidly secured in one of their end portions in mirror image relation to the side portions 16 and 14, respectively, of the frame means 12. The supports 44 and 46 are desirably positioned near the end portion 20 of the frame 12 and project downwardly therefrom in spaced and generally parallel relation. An axle 48 is provided and extends between and is mounted in the other or lower end portions of the supports 44 and 46. Two rear wheels 50 and 52 are rotatably mounted on the opposite end portions of the axle 48.

Two braces 54 and 56 are desirably provided and are secured in one end portion to the collar 22 beneath the end portion 18 of the frame means 12 and the braces 54 and 56 extend rearwardly therefrom in diverging relation and are secured in their other end portions to the lower portion of the supports 44 and 46, respectively. The supports 44 and 46 and the braces 54 and 56 are preferably formed of a tubular material and are desirably of a light weight material such as aluminum.

A kneeling floor or seat is provided and is carried by the frame means 12 and positioned thereacross. The kneeling floor or seat is shown generally at 60 and preferably includes a relatively wide and continuous fabric sheet 62 which extends between and surrounds the side portions 14 and 16 of the frame means 12 with the sheet 62 preferably being positioned between the supports 44 and 46 and the end portion 18 of the frame. Two elongated rods 64 and 66 of like construction are provided and each end portion of each of the rods is provided with a hook which is preferably integrally formed thereon, such hooks being shown at 68 and 70 for the rod 64 and at 72 and 74 for the rod 66. The rods 64 and 66 are positioned on the frame means 12 with the hooks 68 and 72 slidably engaging the side portion 16 and with the hooks 70 and 74 slidably engaging the side portion 14 of the frame means 12 and with the rods 64 and 66 being positioned on opposite sides of the sheet 62. Another continuous fabric sheet 76 is preferably provided and surrounds and is positioned between the rods 64 and 66 and is desirably positioned between the layers of the sheet 62 as is best illustrated in FIGS. 1 and 2. The sheet 76 extends longitudinally of the frame means 12 and is preferably relatively wide so as to substantially cover the distance between the side portions 14 and 16 of the frame. The sheets 62 and 76 can be made of any suitable material, such as woven fabrics containing nylon or other plastics and are preferably flexible to provide a relatively soft kneeling floor or seat.

With the preferred kneeling floor or seat structure 60 of the invention, the vehicle can be readily adapted for use by children of various size and/or ages merely by moving the sheets 62 and 76 longitudinally along the frame means 12 to a comfortable position for the individual child. With the kneeling floor or seat means positioned in the desired location, the device can be propelled by a child having the knee of one leg on the seat or kneeling floor 60 and with the foot of the other leg pushing rearwardly on the supporting surface to propel the vehicle forwardly. The hands of the child are placed on the handle bars 26 to steer the vehicle in the desired direction. If desired, the kneeling floor or seat structure can be positioned relative to the frame means 12 so that the child can reach the pedals 40 and 42 with his feet to propel the vehicle in the manner of a tricycle.

By constructing the vehicle of light-weight tubular metallic materials and by using relatively inexpensive fabric sheets for the kneeling floor or seat structure, the entire vehicle can be made relatively inexpensively and is light in weight for shipping or for use indoors or outdoors as desired.

While the invention has been described in connection with a preferred specific embodiment thereof, it will be understood that this description is intended to illustrate and not to limit the scope of the invention which is defined by the claims.

I claim:

1. A scooter-like vehicle comprising, in combination, a generally rectangular tubular frame having side portions and end portions, a collar secured vertically and centrally to one of said end portions of said frame, a steering post rotatably mounted in said collar and projecting from both ends thereof, a handle bar secured to the upper end of said post, the lower end portion of said post being bifurcated, an axle carried by said bifurcated end portion of said post, a front wheel rotatably mounted on said axle, two crank arms secured in one end portion to opposite ends of said axle, two pedals, the other end portion of each of said crank arms having one of said pedals secured thereto, two supports rigidly secured in one end portion and in mirror image relation on opposite ones of said side portions of said frame near the other of said end portions thereof and projecting downwardly therefrom in spaced and generally parallel relation, an axle extending between and mounted in the other end portions of said supports, two rear wheels rotatably mounted on opposite end portions of said last-named axle, two braces, each of said braces being secured in one portion to said collar below said tubular frame and extending rearwardly therefrom in diverging relation and secured in the other end portion to said supports, a relatively wide and continuous plastic sheet transversely extending between and surrounding said side portions of said frame and positioned between said supports and said one of said end portions of said frame, two elongated rods, each end portion of each of said rods having an integral hook formed thereon, said rods being positioned on said frame with said hooks thereof slidably engaging said side portions of said frame on opposite sides of said sheet, a continuous plastic sheet surrounding and positioned between said rods and passing between the layers of said first-named sheet longitudinal of said tubular frame, said vehicle being constructed and adapted to be ridden by a child with said sheets forming an adjustable seat and said vehicle being propelled by said pedals or in scooter fashion and steered by said handle bars.

2. A scooter-like vehicle comprising, in combination, a generally rectangular frame having side portions and end portions, a collar secured to one of said end portions of said frame, a steering post rotatably mounted in said collar and having a handle bar secured to the upper end portion thereof, a front wheel rotatably mounted on the other end portion of said steering post, pedals operatively connected to said front wheel, two supports secured to opposite ones of said side portions of said frame near the other of said end portions thereof and projecting downwardly therefrom, an axle extending between and mounted in said supports, two rear wheels rotatably mounted on opposite end portions of said axle, a relatively wide and continuous sheet transversely extending between and surrounding said side portions of said frame and positioned between said supports and said one of said end portions of said frame, two elongated rods constructed in the end portions thereof to slidably engage said side portions of said frame on opposite sides of said sheets, a continuous sheet surrounding and positioned between said rods and passing between the layers of said first-named sheet and extending longitudinally of said frame, said vehicle being constructed and adapted to be ridden by a child with said sheets forming an adjustable seat and said vehicle being propelled by said pedals or in scooter fashion and steered by said handle bars.

3. A scooter-like vehicle comprising, in combination, elongated open frame means disposed in a generally horizontal plane, wheels operatively connected to front and rear end portions of said frame means, steering means operatively connected to the front one of said wheels, a horizontally disposed sheet extending between and movably engaging the side portions of said frame means, another horizontally disposed sheet extending transversely of said first-named sheet and positioned between said side portions of said frame means, mounting means for said last-named sheet adjustably supporting same on said side portions of said frame means to be movable therealong, said mounting means engaging said frame means adjacent the ends of said first-named sheet, said vehicle being constructed and adapted to be ridden by a child with said sheets forming an adjustable seat and with said vehicle being propelled in scooter fashion.

4. A vehicle comprising, in combination, elongated open frame means disposed in a generallly horizontal plane and having side portions, wheel means operatively connected to said frame means to movably support said frame means, first horizontally disposed sheet means extending between and movably engaging said side portions of said frame means, second horizontally disposed sheet means extending transversely of said first sheet means and positioned between said side portions of said frame means, mounting means for said second sheet means, said mounting means having portions slidably engaging said side portions of said frame means longitudinally outwardly of the ends of said first sheet means, said vehicle being constructed and adapted to be ridden with said sheet means forming an adjustable support for the rider.

References Cited in the file of this patent
UNITED STATES PATENTS

| | | |
|---|---|---|
| 614,235 | Palmer | Nov. 15, 1898 |
| 1,315,093 | Converse | Sept. 2, 1919 |
| 1,666,827 | McFarlan | Apr. 17, 1928 |
| 2,479,538 | Liljenberg | Aug. 16, 1949 |
| 2,807,308 | Hamilton | Sept. 24, 1957 |
| 2,876,827 | Mirrione | Mar. 10, 1959 |
| 3,017,199 | Sechrist | Jan. 16, 1962 |

UNITED STATES PATENT OFFICE
CERTIFICATE OF CORRECTION

Patent No. 3,123,379            March 3, 1964

Max V. Stocking

It is hereby certified that error appears in the above numbered patent requiring correction and that the said Letters Patent should read as corrected below.

In the sheet of drawing, line 2, and in the heading to the printed specification, line 2, title of invention, for "ADJUSTABLE SEAT FOR CHILD'S VEHICLE", each occurrence, read -- CHILD'S VEHICLE, SCOOTER TYPE, WITH ADJUSTABLE KNEELING FLOOR --.

Signed and sealed this 29th day of September 1964.

(SEAL)
Attest:

ERNEST W. SWIDER            EDWARD J. BRENNER
Attesting Officer            Commissioner of Patents